Jan. 2, 1968     T. L. FAWICK     3,361,178
RESILIENT WHEEL AND COUPLING UNIT THEREFOR
Filed April 14, 1966     3 Sheets-Sheet 1

INVENTOR.
THOMAS L. FAWICK
BY
William J. Flynn
ATTORNEY

United States Patent Office 3,361,178
Patented Jan. 2, 1968

3,361,178
RESILIENT WHEEL AND COUPLING UNIT THEREFOR
Thomas L. Fawick, Shaker Heights, Ohio (% Hotel Statler-Hilton, Cleveland, Ohio 44101)
Filed Apr. 14, 1966, Ser. No. 542,526
7 Claims. (Cl. 152—41)

ABSTRACT OF THE DISCLOSURE

The present resilient coupling unit for a dual wheel has a rigid mounting member for detachable connection to the hub and a pair of rigid rim-support members, one on each axial side of the mounting member, an annular body of rubber-like material is vulcanized between axially-spaced confronting faces of the mounting member and each rim-support member from a location radially inward of the respective rim to a location radially outward past the rim, so as to be cooled by air flowing past the respective tire.

---

This invention relates to a resilient wheel and to a resilient coupling unit for use in a wheel to provide a resiliently deformable connection between its rim and hub parts.

So-called "radial ply" tires are coming into widespread use because of their longer tread life, improved retreading characteristics, and the improved fuel mileage which they provide. Radial ply tires have reinforcing cords which extend from bead-to-bead perpendicular to the circumference of the tire and additional reinforcing cords which extend parallel to the beads, in contrast to conventional tires in which the reinforcing cords extend at acute angles to the tire circumference.

Radial ply tires do not deform under load as much as conventional tires, and therefore they may be said to be more rigid than conventional tires. This presents a serious problem because present-day suspensions for trucks are designed for use with conventional truck tires, relying on the appreciable deformability and resiliency of the tires to give certain riding characteristics and to prevent excessive road shock from being transmitted to the suspension. The use of radial ply tires on conventional rigid wheels of trucks and trailers, without changing the suspensions, may produce an unacceptably "hard" ride and it may subject the suspension to excessive road shock. While this difficulty may be overcome by a complete re-design of the suspension, this would be excessively expensive and it does not solve the problem where radial ply tires are to be used as replacement tires on vehicles already equipped with conventional suspensions designed for use with conventional tires.

The present invention is directed to a novel resilient wheel which overcomes these difficulties, enabling the use of radial ply tires on vehicles having conventional suspensions. In accordance with the present invention, the wheel embodies a novel coupling unit connected between its rim and hub parts to provide resilient deformability which, in combination with the conventional suspension, produces the desired riding characteristics. The resilient deformability of the present wheel also protects the suspension against excessive road shock.

It is an object of this invention to provide a novel and improved resilient wheel.

Also, it is an object of this invention to provide a novel and improved resilient coupling unit for connection between the hub and rim parts of a wheel to enable the wheel to deform resiliently under load.

Another object of this invention is to provide a novel and improved resilient wheel embodying deformable rubber-like material positioned to be cooled by air flowing past a tire on the wheel.

Another object of this invention is to provide a novel and improved resilient coupling unit for connection between the hub and rim of a wheel and embodying deformable rubber-like material which, when the wheel is assembled, will be located at one axial side of the rim so as to be cooled by air flowing past a tire on the rim.

Another object of this invention is to provide a novel and improved wheel including a novel resilient coupling unit having rigid parts connected respectively to the hub and rim and rubber-like material vulcanized between these rigid parts at a location effective to provide maximum strength of the vulcanized bond between them.

Another object of this invention is to provide a novel and improved resilient coupling unit having rigid parts for connection respectively to the hub and rim of the wheel and rubber-like material vulcanized between these rigid parts at a location effective to provide maximum strength of the vulcanized bond between them.

Another object of this invention is to provide a novel and improved dual wheel which retains the hub and rims of a conventional dual wheel and further embodies a novel resilient coupling unit connected between the hub and rims to provide the desired resilient deformability in the wheel.

Another object of this invention is to provide a novel and improved resilient coupling unit for connection in a dual wheel between the hub and the rims to cushion the hub from shocks imparted to either rim.

Another object of this invention is to provide a novel and improved dual wheel having a novel resiliently deformable coupling unit connecting both wheel rims to the hub and projecting between the two rims to be cooled by air flowing between the tires carried by the rims.

Further objects and advantages of this invention will be apparent from the following detailed description of two presently-preferred embodiments thereof, which are illustrated in the accompanying drawings.

Figure 1:
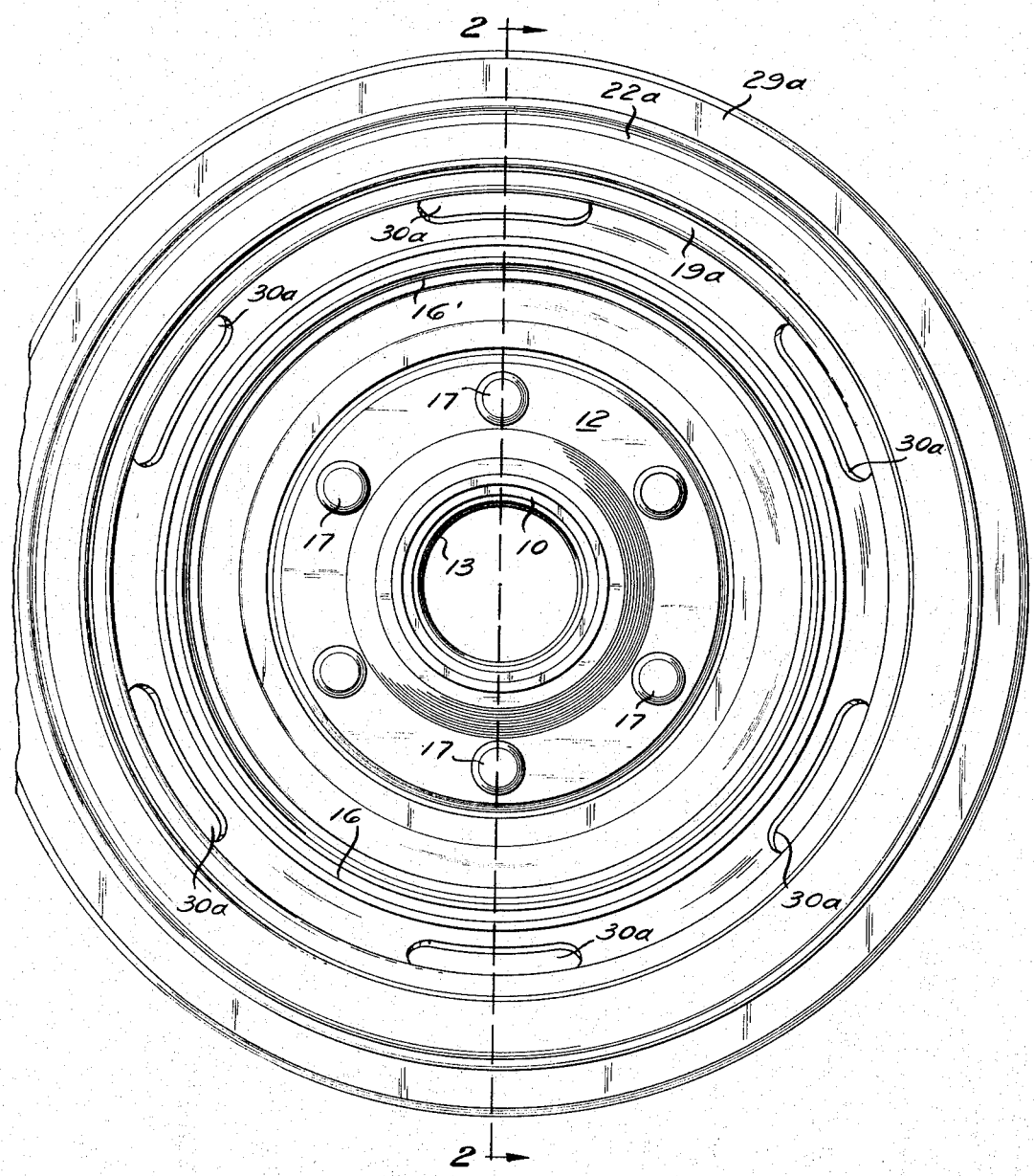
FIGURE 1 is an end view of a free wheeling dual wheel in accordance with a first embodiment of the present invention.
Figure 2:
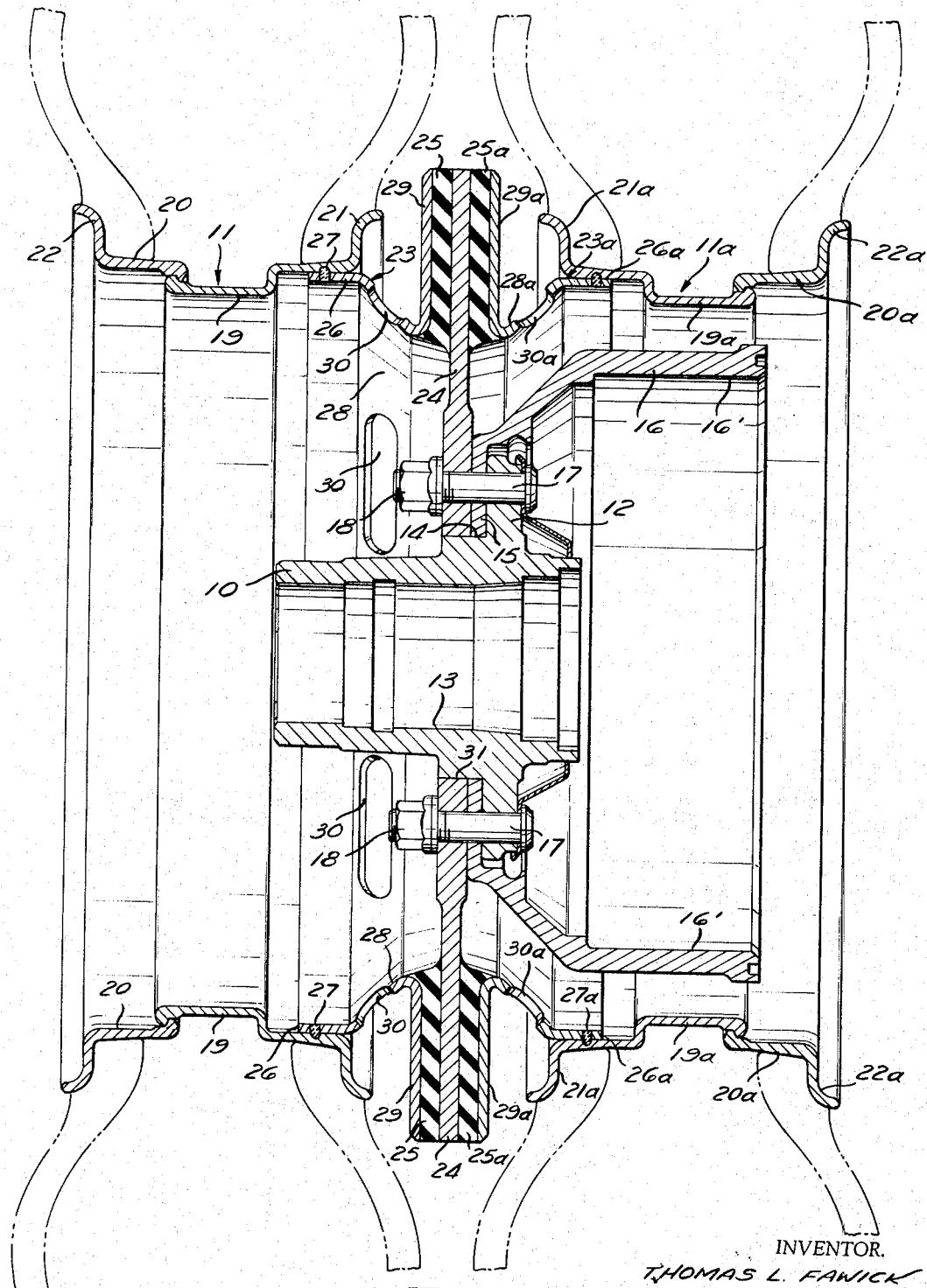
FIGURE 2 is an axial section through this dual wheel, taken along the line 2—2 in FIG. 1.

Referring first to FIG. 2, the dual wheel illustrated there is a free-wheeling truck wheel including a rigid, annular inner, hub 10 adapted to be mounted on an axle of the truck (not shown) and a pair of rigid, annular, outer rims 11 and 11a for supporting inflatable radial ply tires, shown in phantom.

The hub 10 is a one-piece body having an annular radial flange 12 at its radially outward extremity and having a central axial opening 13 for receiving the end of the axle.

At the axially outward side of its flange 12 the hub 10 presents an axially outwardly-facing annular recess 14 which receives the radially disposed end flange 15 of a conventional brake drum 16. The brake drum flange 15 is attached to the hub flange 12 by a plurality of bolt-and-nut assemblies 17, 18. The inside braking surface 16' of the brake drum is positioned radially outward and axially inward from the hub 10.

The hub 10 itself is identical to a known type of dual-wheel hub for free-wheeling wheels on a truck or tractor.

The axially outboard rim 11 is a two-piece rim, consisting of a main annular rim member 19 and an annular end piece 20 which is snapped over member 19. These two parts present respective curved end flanges 21 and 22 against which the respective beads of the tire seat, as shown in phantom in FIG. 2.

The axially inboard rim 11a is a mirror image of the outboard rim 11, with similar parts being given the same reference numerals, with an *a* subscript added.

Prior to the present invention, these rims were welded to the outer ends of respective annular mounting plates which had their inner ends seated side-by-side in the aforementioned recess 14 on the outside of hub 10. These mounting plates were detachably connected to the flange 12 of the hub by the same bolts and nuts 17, 18 used to attach the brake drum 16 to the hub.

In accordance with the present invention, these two individual mounting plates for the wheel rims are replaced by a novel resilient coupling unit which comprises a pair of rigid annular rim-support members 23 and 23a welded to the main rim members 19 and 19a, respectively, a rigid annular mounting plate 24 bolted to the hub flange 12, and deformable and resilient rubber or rubber-like material 25 and 25a sandwiched between and bonded to the mounting plate 24 and the respective rim-support members 23 and 23a.

The rim-support member 23 includes an axially outwardly disposed cylindrical end wall 26 having a snug fit inside the axially inward end of the main rim member 19 and welded thereto at 27, an annular connecting wall 28 which is inclined axially and radially inward from the inner end of wall 26, and an annular, radially extending wall 29 which is spaced axially inward from the rim 11. This annular wall 29 has a radial extent from a location radially inward past the rim 11, where it is connected to the inclined connecting wall 28, to a location radially outward beyond the outermost part of the rim 11. The connecting wall 28 of the rim-support member 23 has a plurality of circumferentially elongated, arcuate openings 30, located axially inward past the rim 11, for passing air from between the tires into the interior of the wheel.

The rim-support member 23a for the inboard rim 11a is a mirror image of member 23, with corresponding parts having the same reference numerals as those of member 23, but with an *a* subscript added.

The mounting plate 24 has a central opening 31 with a close sliding fit over the hub 10 at the axially outward side of the brake drum flange 15. The mounting plate 24 and the brake drum flange 21 have bolt holes which register with each other and with bolt holes on the bolt circle of the hub flange 12 for passing the previously-mentioned bolts 17. The nuts 18 clamp the mounting plate 24 and the brake drum flange 21 against the outside of the hub flange 12, as shown in FIG. 2. The mounting plate 24 extends radially outward from the hub 10 and is disposed midway axially between the confronting radial walls 29 and 29a of members 23 and 23a.

The rubber-like material 25 between the rim-support member 23 and the mounting plate 24 preferably is a one-piece mass of rubber or rubber-like material which is vulcanized to the axially inward face of the radial wall 29 on the rim-support member 23 and to the confronting axially outward face of the mounting plate 24, preferably throughout the complete radial extent of wall 29, from a location radially inward past the rim 11 to a location radially outward past the rim. The rubber-like mass 25 is bonded to both of these faces throughout their entire circumferential extent. In one practical embodiment, this rubber-like mass has an axial thickness of about one-half inch and a radial thickness of four inches or so, so that it is capable of appreciable resilient deformation both radially and axially.

The rubber-like mass 25a connecting the mounting plate 24 to the rim-support member 23a is a mirror image of the rubber-like mass 25, just described.

Preferably, the rubber-like masses 25 and 25a are vulcanized to the respective rigid pieces 23, 24 and 23a in a mold, so that the entire sub-assembly of parts 23, 24, 25, 25a and 23a is a unitary structure before it is connected to the two rims 11 and 11a and to the hub 10. Preferably, also, the rim-support members 23 and 23a of this coupling unit are welded to the respective rims 11 and 11a before the mounting plate 24 is bolted to the hub 10.

The appreciable radial and axial thickness of each rubber-like ring 25 or 25a in the present resilient coupling unit enables it to deform resiliently under road shock imparted to the respective rim 11 or 11a through the respective tire, so that it substantially absorbs the shock and prevents it from being transmitted to the wheel hub. The movement of the tire rim 11 or 11a is imparted rigidly to the respective rim-support member 23 or 23a, but the mounting plate 24 remains rigid on the hub 10 and the rubber body 25 or 25a deforms resiliently to accommodate the movement of the respective rim relative to the hub.

The bonding of the rubber-like material 25 and 25a to the rim-support members 23, 23a and to the mounting plate 24 is at the maximum feasible distance radially outward from the axle, so as to provide maximum area of bonded engagement between these parts for maximum strength in the resilient coupling unit.

Also, the rubber-like material 25, 25a is positioned axially between the two tire rims 11, 11a and, in part, radially beyond these rims, where it can be cooled by air flowing between the tires carried by these rims. This is extremely important to prevent deterioration of the rubber-like material due to heat developed by the load on it.

Despite the fact that the mounting plate 24 extends between the two tires for maximum strength of the resilient coupling bodies 25, 25a and for maximum cooling, as described, there is virtually no likelihood that either tire would be deflected axially or radially enough to strike mounting plate 24.

The openings 30a in the rim-support member 23a facilitate the flow of air across the brake drum 16 to prevent it from becoming overheated in use.

If either tire goes flat, the resilient coupling provided in the present wheel will carry the increased load without damage.

Figure 3:
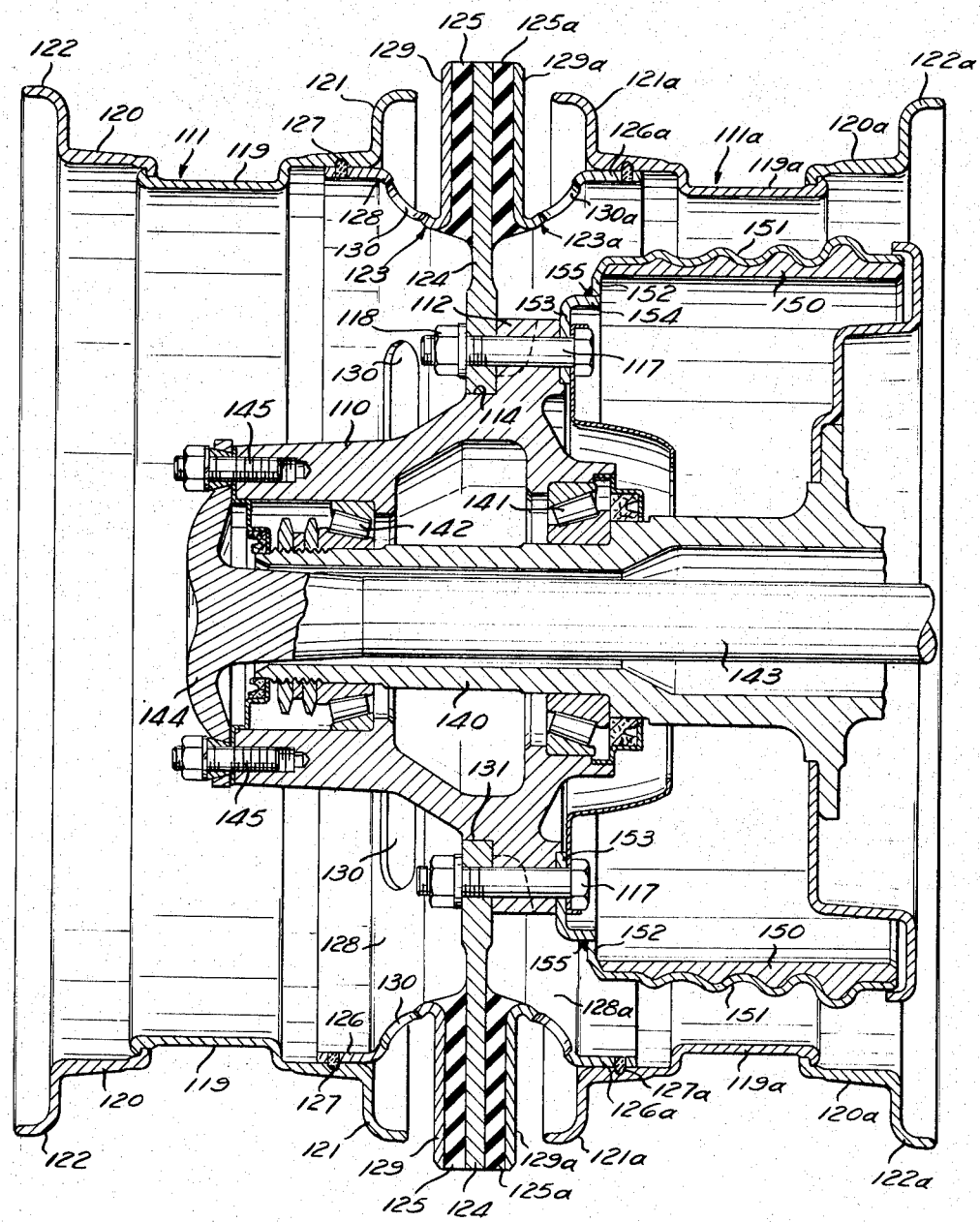
FIGURE 3 is an axial section through a dual wheel which is a drive wheel on a truck, in accordance with a second embodiment of this invention.

FIGURE 3 illustrates a second embodiment of the present invention which is intended for use as a driving wheel on a truck. The elements of this wheel which correspond to those of the embodiment shown in FIG. 2 are given the same reference numerals as in FIG. 2, plus 100.

The wheel hub 110 is rotatably mounted on a stationary hollow axle 140 of the truck by a pair of axially spaced roller bearings 141 and 142. A rotatable drive shaft 143 extends freely through this axle and has an annular flange 144 at its axially outward end which is bolted to the axially outward end of the wheel hub 110 by a plurality of circumferentially spaced bolts 145.

The brake drum comprises an annular frictionally-engageable member 150 secured to the inside of a housing 151 whose axially outward end is turned in radially at 152. The brake drum has a mounting flange which presents an annular radially-disposed wall 153 and a generally cylindrical lip 154 integral with wall 153. This lip 154 projects axially inward and fits snugly inside the inturned end wall 152 of housing 151 and is welded at 155 to the latter. As shown in FIG. 3, the radial wall 153 of the mounting flange on the brake drum is clamped tightly against the axially inward end of the wheel hub flange 112 by the heads of the bolts 117.

In this embodiment the resilient coupling unit made up of mounting plate 124, rubber-like masses 125, 125a and rim-support members 123, 123a provides a deformable and resilient cushion which prevents road shock from being transmitted to the hub 110 of the wheel. In addition, it cushions the drive shaft 143 against road shock, so that the drive gearing is protected against road shock damage even under the most severe conditions of use.

While two presently-preferred embodiments of this invention have been described in detail and illustrated in the accompanying drawings, it is to be understood that various structural modifications, omissions and refinements which depart from the disclosed embodiments may be adopted without departing from the spirit and scope of the present invention. For example, by omitting one of the rims and the corresponding rim-support member and the rubber cushioning material in either of the illustrated dual wheels, a single wheel structure is provided which embodies the novel principles and advantages of the present invention.

I claim:

1. In a vehicle wheel having a hub and a tire-supporting rim, the improvement which comprises a rigid mounting member detachably connected to said hub, a rigid rim-support member connected to said rim, said mounting member and said rim-support member presenting axially-spaced confronting faces at one axial side of the rim which project radially outward past the rim, and a mass of deformable and resilient rubber-like material vulcanized between said faces and projecting radially outwardly past the rim to be cooled by air flowing past the tire on the rim.

2. A vehicle wheel according to claim 1, wherein said confronting faces extend annularly around the axis of the wheel from a location radially inward past the rim to a location outward past the rim, and said rubber-like material is an annular mass which is vulcanized to said faces across the latters' extent between locations thereon radially inward and outward past the rim.

3. In a dual wheel having a hub and a pair of axially spaced tire-supporting rims, the improvement which comprises: a pair of rigid rim-support members attached respectively to said rims and spaced apart from one another axially between said rims, a rigid mounting member connected to said hub and extending between said rims and said rim-support members, and resiliently deformable rubber-like material sandwiched between and bonded to said mounting member and each rim-support member axially between said rims to be cooled by air flowing between the tires on the rims, said rim-support members, said mounting member, and said rubber-like material projecting radially outward past the rims.

4. A dual wheel according to claim 3, wherein each of said rim-support members presents a radially-extending wall positioned axially between the rims and extending annularly around the wheel axis, said mounting member extends between said annular walls of the rim-support members, and said rubber-like material is vulcanized between said mounting member and said annular walls of the rim-support members.

5. A resilient dual wheel according to claim 4, wherein said annular wall of each rim-support member has a radial extent from a location radially inward past the respective rim to a location radially outward past the respective rim, and said rubber-like material is vulcanized to said mounting member and to the radially-extending annular walls of the rim-support members from a location radially inward past the respective rim to a location radially outward past the respective rim.

6. A coupling unit for use in a wheel having a hub and a tire-supporting rim, said coupling unit comprising a rigid rim-support member for connection to the rim having a projecting portion positioned to extend at one axial side of the rim when the rim-support member is attached to the rim, a rigid mounting member for connection to the hub having a projecting portion positioned to extend at said one axial side of the rim beyond said projecting portion of the rim-support member, and a mass of rubber-like material positioned axially between and vulcanized to said projecting portions of the rim-support and mounting members at said one axial side of the rim to be cooled by air flowing past the tire on the rim, said rubber-like material and said projecting portions of the rim-support and mounting members being positioned to extend radially outward beyond the rim at said one axial side of the rim when said rim-support and mounting members are connected respectively to the rim and hub of the wheel.

7. A coupling unit according to claim 6, wherein said projecting portion of the rim-support member is a radially-extending annular wall, and said rim-support member has a cylindrical end wall shaped and dimensioned to fit inside the rim and an annular connecting wall extending radially inward and axially away from said cylindrical end wall to said radially-extending annular wall, and wherein said rubber-like material is vulcanized to said radially-extending annular wall across substantially the complete radial extent of the latter.

References Cited

UNITED STATES PATENTS

| | | | |
|---|---|---|---|
| 2,386,030 | 10/1945 | Ash | 301—36 |
| 2,850,065 | 9/1958 | Appel | 152—41 |
| 3,139,309 | 6/1964 | Breton | 301—36 |

FOREIGN PATENTS 982,057   1/1951   France.

OTHER REFERENCES

Goetze: German printed application No. 1,099,878, published 2–1961, Class 152–47, (1 sht. dwg. 2 pp. spec.).

RICHARD J. JOHNSON, *Primary Examiner.*